(12) United States Patent
Ophir et al.

(10) Patent No.: US 11,108,993 B2
(45) Date of Patent: Aug. 31, 2021

(54) PREDICTIVE NETWORK MANAGEMENT FOR REAL-TIME VIDEO WITH VARYING VIDEO AND NETWORK CONDITIONS

(71) Applicant: Telicomm City Connect, Ltd., Shoham (IL)

(72) Inventors: Lior Ophir, Herzliya (IL); Shlomo Arbel, Shoham (IL)

(73) Assignee: TELICOMM CITY CONNECT, LTD., Shoham (IL)

( * ) Notice: Subject to any disclaimer, the term of this patent is extended or adjusted under 35 U.S.C. 154(b) by 0 days.

(21) Appl. No.: 16/467,056

(22) PCT Filed: Dec. 19, 2017

(86) PCT No.: PCT/IL2017/051364
§ 371 (c)(1),
(2) Date: Jun. 6, 2019

(87) PCT Pub. No.: WO2018/116298
PCT Pub. Date: Jun. 28, 2018

(65) Prior Publication Data
US 2020/0007823 A1    Jan. 2, 2020

Related U.S. Application Data

(60) Provisional application No. 62/581,868, filed on Nov. 6, 2017, provisional application No. 62/435,867, filed on Dec. 19, 2016.

(51) Int. Cl.
*H04N 7/18* (2006.01)
*H04N 19/152* (2014.01)
(Continued)

(52) U.S. Cl.
CPC ............. *H04N 7/181* (2013.01); *H04N 5/232* (2013.01); *H04N 19/152* (2014.11);
(Continued)

(58) Field of Classification Search
CPC ...... H04N 7/181; H04N 19/152; H04N 19/17; H04N 5/232; H04N 21/23439; H04N 21/6377; G06T 2207/10016
See application file for complete search history.

(56) References Cited

U.S. PATENT DOCUMENTS

| 8,234,682 B2 | 7/2012 | Dvir et al. |
| 9,113,486 B2 | 8/2015 | Payette et al. |

(Continued)

FOREIGN PATENT DOCUMENTS

| WO | 2009009141 A1 | 1/2009 |
| WO | 20166055375 A1 | 4/2016 |

OTHER PUBLICATIONS

Wang (Network traffic prediction based on Grey Neural Network Integrated model—2008 International Conference on Computer Science and Software Engineering, DOI 10.1109/CSSE.2008.1070) (Year: 2008).*

(Continued)

*Primary Examiner* — Nasim N Nirjhar
(74) *Attorney, Agent, or Firm* — Kligler & Associates Patent Attorneys Ltd

(57) ABSTRACT

A system and methods for controlling video streaming over a shared communications channel from a set of two or more video cameras to a base station, including acquiring video capture rate data values from each video camera; acquiring transmissions rate data values from each video camera indicative of a rate of transmission from each video camera to the base station over the shared communications channel; acquiring channel bandwidth data values from said shared communications channel indicative of a supported rate of transmission by the shared communications channel; predicting, from the acquired video capture, communications rate and channel bandwidth data values, future values of at least one of (1) future captured video rate data; (2) future (Continued)

transmission rate data; or (3) future channel bandwidth; and responsively providing that video rates of transmission from all the cameras are supported by the shared communications channel.

34 Claims, 11 Drawing Sheets

(51) Int. Cl.
    *H04N 19/17*     (2014.01)
    *H04N 5/232*     (2006.01)
    *H04N 21/2343*     (2011.01)
    *H04N 21/6377*     (2011.01)

(52) U.S. Cl.
    CPC ....... *H04N 19/17* (2014.11); *H04N 21/23439* (2013.01); *H04N 21/6377* (2013.01); *G06T 2207/10016* (2013.01)

(56) References Cited

U.S. PATENT DOCUMENTS

| | | | |
|---|---|---|---|
| 9,716,916 | B2 | 7/2017 | Major et al. |
| 2005/0002453 | A1 | 1/2005 | Chang et al. |
| 2010/0045799 | A1* | 2/2010 | Lei ........................ G06T 7/254 348/169 |
| 2010/0064337 | A1* | 3/2010 | Dvir ....................... H04N 5/76 725/115 |
| 2012/0230390 | A1 | 9/2012 | Akkor |
| 2012/0257568 | A1* | 10/2012 | Cai ...................... H04L 5/0055 370/328 |
| 2013/0263200 | A1* | 10/2013 | Li ..................... H04N 21/2662 725/116 |
| 2013/0297743 | A1* | 11/2013 | Eschet ................. H04L 65/60 709/219 |
| 2014/0286438 | A1 | 9/2014 | Apte |
| 2017/0006255 | A1* | 1/2017 | Kareev ................ G08G 1/0175 |
| 2017/0041238 | A1 | 2/2017 | Do et al. |
| 2017/0134493 | A1* | 5/2017 | Chang ............... G06F 16/24568 |
| 2017/0214970 | A1 | 7/2017 | Hauenstein et al. |
| 2017/0257664 | A1* | 9/2017 | Tam .................... H04N 21/435 |

OTHER PUBLICATIONS

Cox., "Principles of Statistical Inference", Cambridge University Press, pp. 1-236, year 2006.
Einicke., "Smoothing, Filtering and Prediction: Estimating the Past, Present and Future", Published by Intech, pp. 1-286, year 2012.
Julier et al., "Unscented Filtering and Nonlinear Estimation", Proceedings of the IEEE, vol. 92, No. 3, pp. 401-422, Mar. 2004.
Mahmud et al., "A Poisson Process Model for Activity Forecasting", IEEE International Conference on Image Processing (ICIP), pp. 3339-3343, Sep. 2016.
International Application # PCT/IL2017/051364 search report dated Apr. 6, 2018.
Munim et al., "Forecasting container shipping freight rates for the Far East—Northern Europe trade lane", Maritime Economics & Logistics, vol. 19, No. 1, pp. 106-125, year 2016.
Li et al., "Forecasting the REITs and stock indices: Group Method of Data Handling Neural Network approach", Pacific Rim Property Research Journal, vol. 23, No. 2, pp. 1-38, year 2017.
Kalman., "A New Approach to Linear Filtering and Prediction Problems", Journal of Basic Engineering, vol. 82, pp. 35-45, year 1960.
Kleeman., "Understanding and Applying Kalman Filtering", Department of Electrical and Computer Systems, Proceedings of the Second Workshop on Perceptive Systems, Curtin University of Technology, Perth, Australia, pp. 1-37, Jan. 25-26, 1996.
Wang et al., "RTP Payload Format for H.264 Video", Request for Comments: 6184, pp. 1-101, May 2011.
Cisco., "Fundamentals of Digital Video", 2 pages, Dec. 2, 2008.
EP Application # 17832824.1 Office Action dated May 20, 2021.

\* cited by examiner

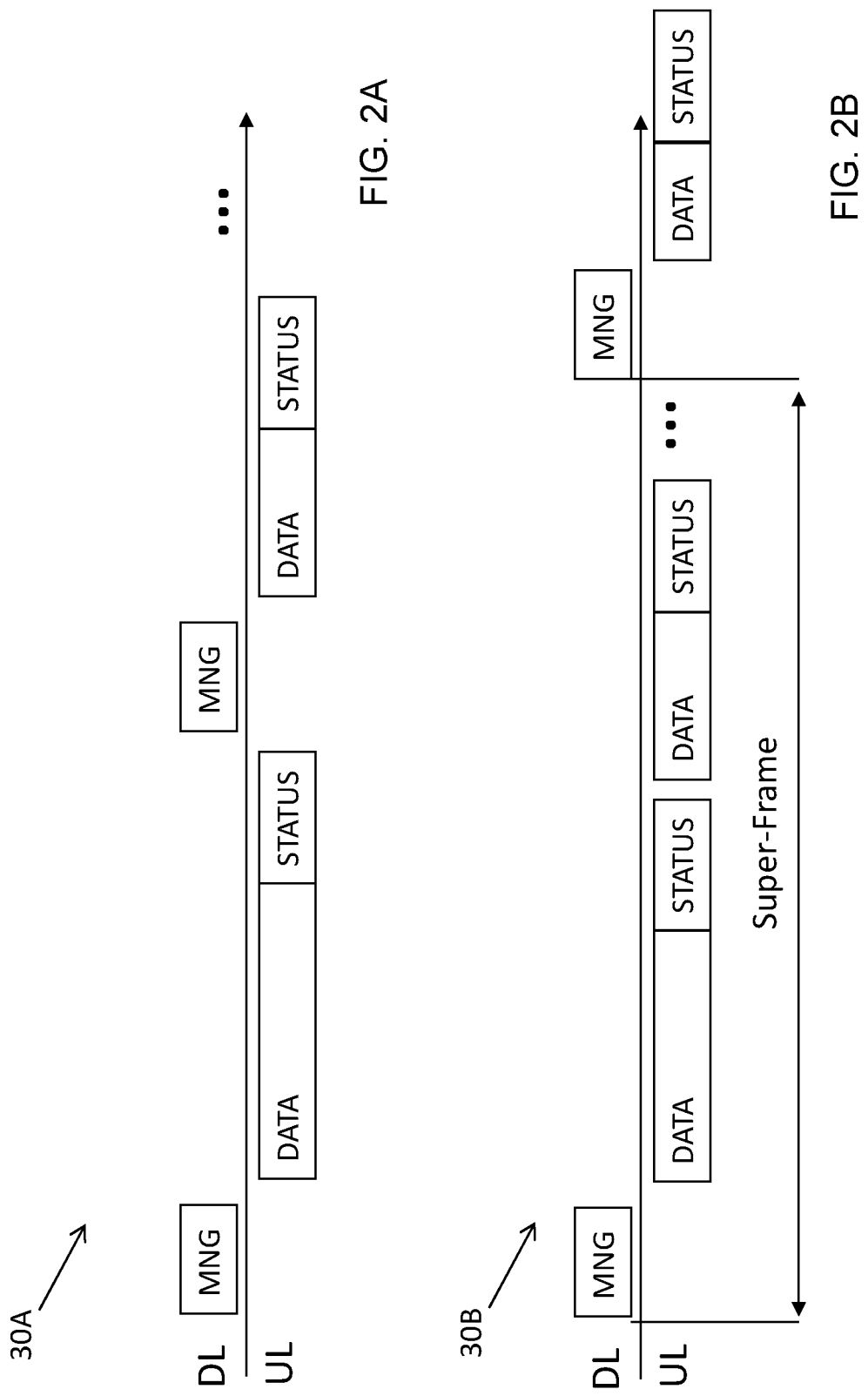

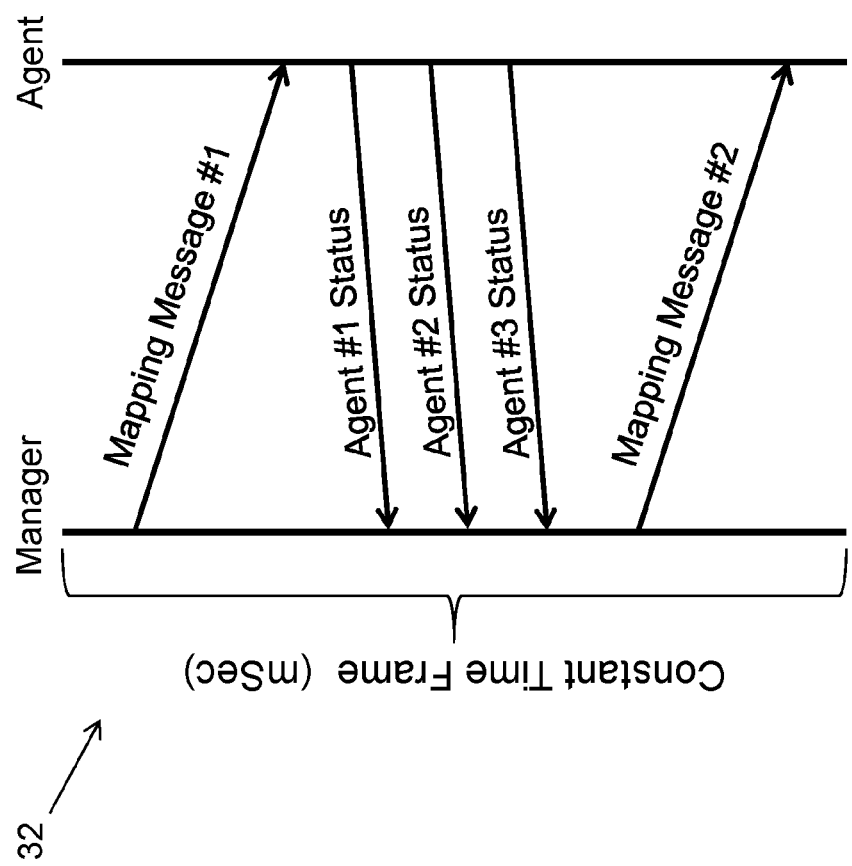

34A

| Field Name | Size | Content | Comments |
|---|---|---|---|
| Version | 1 Byte | 1 | |
| SFIndex | 4 bytes | Counter | |
| Message Type | 1 byte | 1 | |
| Node Control | 13 bytes each | See below | One Node Control for each node requested to transmit in the mapped superframe |

| Field Name | Size | Content | Comments |
|---|---|---|---|
| Node ID | 2 Byte (Unsigned Short INT) | # | Support up to 16 nodes |
| Start | 4 Byte | UTC | Tx start time in mS from Mapping reception (from superframe start time) |
| Data | 4 Byte | Buffer size | Amount of buffered data to send to WiFi in units of 200kB |
| Encoder profile | 1 Byte (Unsigned char) | | |

| Field Name | Size | Content | Comments |
|---|---|---|---|
| Version | 1 byte | | |
| SFIndex | 4 Bytes | | |
| Message type | 1 byte | 0x2 | |
| Node ID | 2 Bytes(UShort) | | Support up to 16 nodes |

FIG. 2F

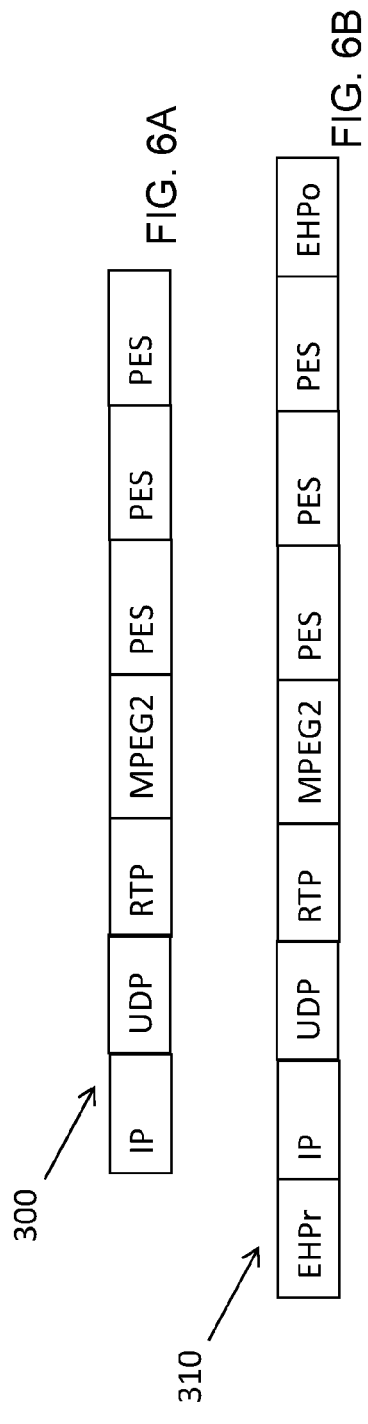
FIG. 6A
FIG. 6B
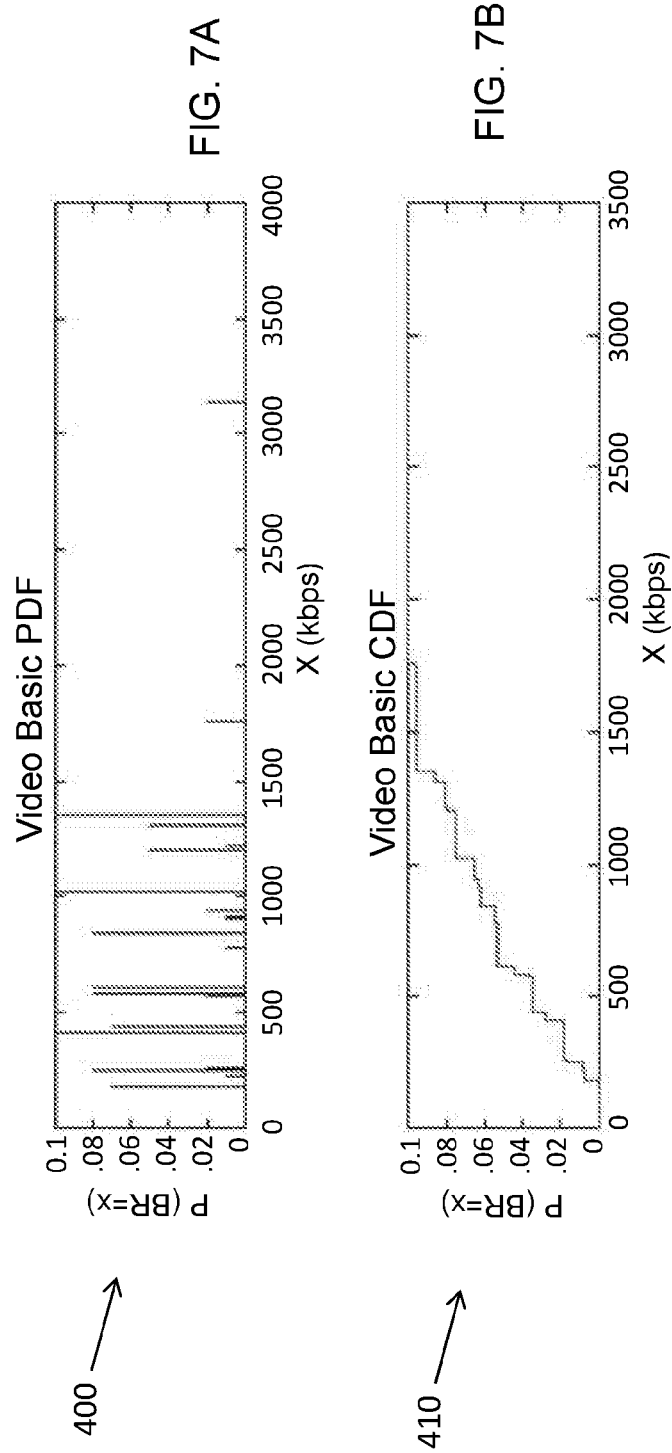
FIG. 7A
FIG. 7B

PREDICTIVE NETWORK MANAGEMENT FOR REAL-TIME VIDEO WITH VARYING VIDEO AND NETWORK CONDITIONS

RELATED APPLICATION DATA

This application claims the benefit of U.S. Provisional Patent applications 62/581,868, filed 6 Nov. 2017, and 62/435,869, filed 19 Dec. 2016.

FIELD OF THE INVENTION

The present invention is directed to systems and methods for managing a network supporting video transmission.

BACKGROUND

Multi-camera networks are used in many settings, such as "smart city" and "safe city" projects, in which a municipality places a large number of cameras throughout the city, as well as in enterprise campuses and in homes. A video stream from each camera is transferred to a control center (or to the "cloud") to be watched in real time or recorded for later viewing as needed. Key enablers for multi-camera networks are: cost (installation and usage) and flexibility. As the number of cameras grow, and especially with the requirement and availability of High Definition (HD) cameras, the data rate that needs to be transferred from each camera and the overall network data rate become very high, giving rise to a technical problem: how to transfer all the video streams into one or several control centers.

Typical video cameras that provide video streams capture live video, compress the captured images, and transmit the compressed video stream, for example using the H.264 standard. These steps are normally done inside the camera. For optimal compression, variable bit rate (VBR) compression is used, but constant bit rate (CBR) compression is more common on networks to provide a constant level of quality. CBR rates of 2.3 Mbps are typical for live monitoring, while stored video streams often use a CBR of 1.3 Mbps.

Typical methods of system management and/or data rate adjustment have several problems. If CBR is used, even when managing the quality (and hence the per camera bit-rate) the overall required bit-rate for multi-camera systems is high, meaning that bandwidth use is inefficient. On the other hand, if VBR is used, although the mean overall bit-rate is reduced, momentary bit-rate peaks (resulting from the stochastic nature of the captured video) cannot be supported by the communications network. The varying nature of the actual supported bit-rate by the communications system, in addition to the phenomenon of momentary "drops" in supported bit-rate by the network, results in momentary losses of video data. These losses, when video is monitored, result in "black screen" effects that are often unacceptable. Network management systems may manage transmission data rates of cameras, but the management is a posteriori, that is, required real-time video is already lost before the management systems react.

Networked video cameras may be connected by wired connections or by wireless connections to their base station/access point/gateway/control center. Wired connections generally support higher data rates but installation is more expensive than for wireless connections. Wireless connections are generally cheaper to install and provide more flexibility. Technologies include free licensed RF bands, such as WiFi, or licensed RF bands, such as LTE cellular services.

U.S. Pat. Nos. 8,234,682 and 9,113,486, describe systems whereby transmission bit rates of cameras sharing a video network are controlled by "managers". Such managers may, for example, measure the available bandwidth (BW) for all cameras, and change camera configurations to fit into the limited bandwidth. However, such operation may result in lost video transmissions during the period that the camera bit rates are being adjusted.

SUMMARY

Various embodiments of the present invention provide systems and methods for predictive network management for real-time video transmission in varying video and network conditions. A large number of cameras may connect to a fast communications backbone, and then to a control center (or any device connected to the communications backbone, such as smartphones). Applications include smart city applications, home/enterprise security/control applications, homeland security applications, mobile camera (e.g., drone) applications, as well as any other application where it is beneficial to reduce the overall system transmission data rate to allow robust real-time video transmission from cameras via a bandwidth (BW) limited channel. Video networks may be wired networks or wireless networks.

Embodiments provide a systems and methods for controlling video streaming over a shared communications channel from a plurality of video cameras to a base station, by a process including acquiring video capture rate data values from each video camera, acquiring transmission rate data values from each video camera indicative of a rate of transmission from each video camera to the base station over the shared communications channel, acquiring channel bandwidth data values from said shared communications channel indicative of a supported rate of transmission by the shared communications channel, responsively predicting, from the acquired video capture, communications rate and channel bandwidth data values, future values of at least one of: (1) future captured video rate data; (2) future transmission rate data; or (3) future channel bandwidth; and responsively to the prediction providing that video rates of transmission from all the cameras are supported by the shared communications channel.

The present invention will be more fully understood from the following detailed description of embodiments thereof.

BRIEF DESCRIPTION OF DRAWINGS

The accompanying drawings illustrate embodiments of the disclosed subject matter and together with the detailed description serve to explain principles of these embodiments. Structural details are shown only as needed for a fundamental understanding of the disclosed subject matter and various ways in which it may be practiced.

FIGS. 2A-2F are pictorial diagrams of communication protocols for real-time, predictive, video network management, according to embodiments of the present invention.

FIGS. 6A and 6B illustrate examples of a video packet without encapsulation and of a video packet with encapsulation, for error handling, according to an embodiment of the present invention.

FIGS. 7A and 7B illustrate statistical functions of transmission data rate for predictive modelling, according to an embodiment of the present invention.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Figure 1:
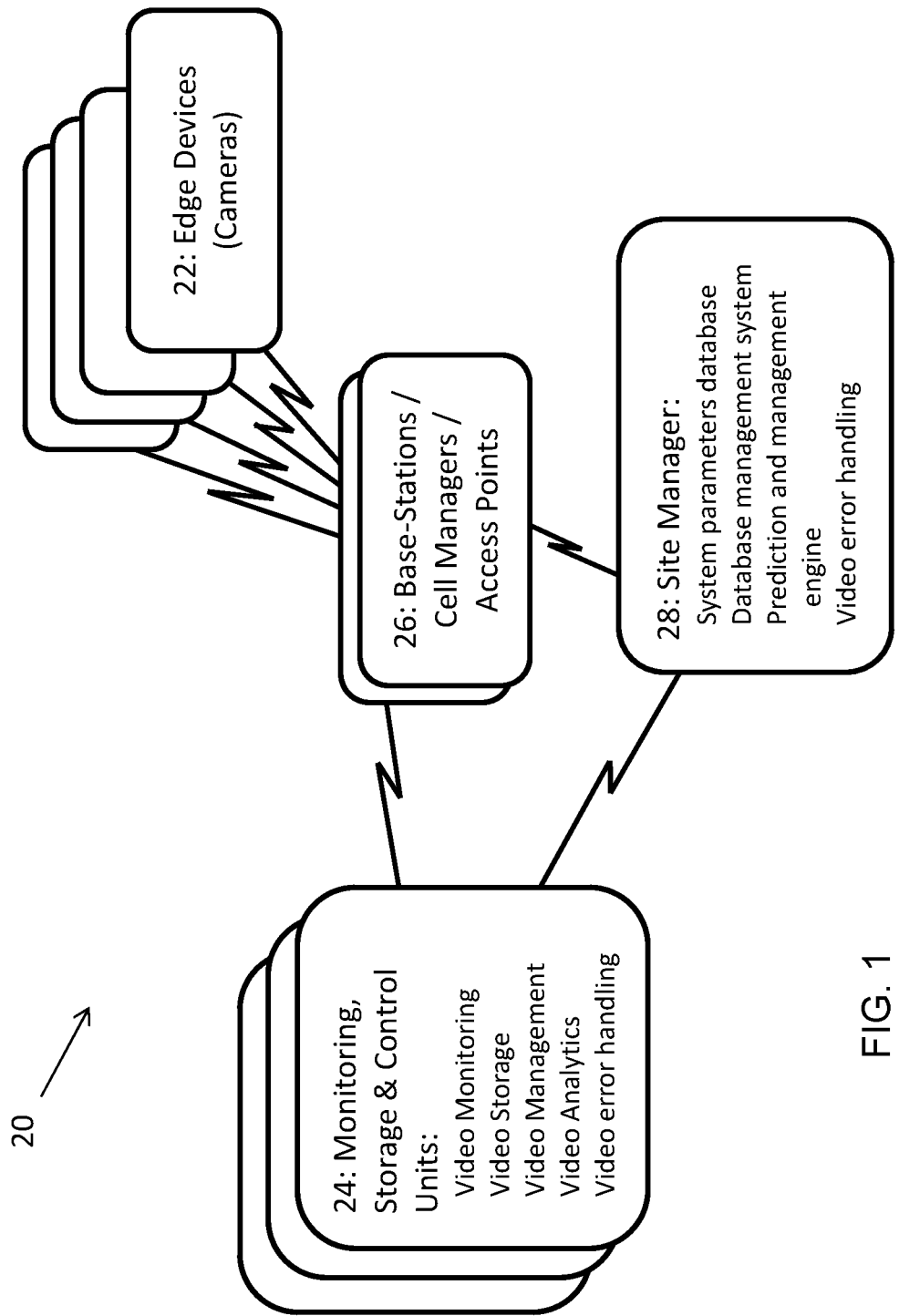
FIG. 1 is a schematic, pictorial illustration of a system for real-time, predictive, video network management, according to an embodiment of the present invention.

FIG. 1 is a schematic, pictorial illustration of a system 20 for real-time, predictive, video network management, according to an embodiment of the present invention. Multiple video cameras, or edge devices 22 communicate over a wired or wireless network with one or more monitoring, storage and control units 24. The communications is typically facilitated by one or more base stations 26, or other means of wired or wireless communications having a bandwidth-limited communications channel.

In typical configurations, multiple edge devices share a common communications channel for communications with one base station. This is considered a "single cell" scenario". A system may also have multiple base stations (which may be access points or routers, etc.), each base station serving a hub of a multi-camera cell. This multi-cell configuration is attractive in wireless scenarios such as WiFi or cellular, in which the bandwidth is limited and may be varying. Physically, the geographic areas of cells may overlap. As described hereinbelow, edge devices may also participate in multiple cells.

The edge devices generally provide live video feeds, but may also include local storage and video playback capabilities. The edge devices typically include processing units that perform video processing, including compression, as well as real-time condition management and reporting. Edge devices may also include video management capabilities, as well as video analytics. The edge devices may be cameras that communicate through an external communications unit with the base station, or may have internal modem capabilities. The edge devices may also be cameras attached to special purpose video processing dongles, as described further hereinbelow.

The monitoring, storage and control units may provide: 1) video monitoring; that is video monitored by human operators; 2) video storage for future playback; 3) Video Management Systems (VMSs); 4) Video Analytics Systems (VAs); and Video error handling.

A site manager 28 stores and manages system parameters, including camera configuration parameters, and operates a prediction and management engine described further hereinbelow. Typically, the monitoring, storage and control units receive video streams from the edge devices and generally include video decoders to provide the monitoring function. The site manager receives from each edge device indicators of edge device operation. These indicators are data values representing measurements such as captured video rates from each edge device and transmission rates from each edge device. The site manager may also measures parameters of the communications channel error rates and loads to determine bandwidth rates of the communications channel. The edge devices may provide these measurements to the site manager in status messages, according to the communications protocols described below. The site manager may request status messages by sending out message requests, also referred to hereinbelow as "mapping messages" or MNGs. Multiple data values for each parameter are generally acquired by the site manager as time-based sequences, these sequences then being stored as data vectors in the storage of the site manager. The prediction algorithms described below generally operate on these data vectors.

Compressed video bit rates varies with time, not only for VBR transmission, but also for CBR when cameras and/or compression parameters are changed. The supported bit rate by the channel also varies with time. Both video capture and communications bit rates for each edge device may change independently over time, and therefore are measured and reported independently. The uplink (UL) communications channel from the edge devices to the base station is usually a bottleneck, requiring a high bit rate for video (including audio), status messages, and control messages, while the downlink (DL) bit rate (to cameras) is usually lower, requiring only control (also referred to hereinbelow as "mapping") messages. Real-time conditions are usually measured at each edge device and reported to the site manager over a predetermined protocol, described below. The site manager is generally implemented as a software process that may operate in a server, either in a network control center (together with some/all blocks of the monitoring/storage/control unit) or remotely in "the cloud". The site manager may alternatively be embedded into the base station or in a separate device (e.g., server) that may be connected to the base station over a high-speed backbone and can reside in proximity to an access point of the base station.

The data rate for transmitting compressed video may depend on the actual captured video scene, as well as on parameters of the capturing device (camera, e.g., resolution, frame-rate, color depth, etc.), the compression scheme (MJPEG, H.264, H.265, etc.) and its compression parameters (e.g., compression depth, allowed distortion, allowed computational complexity etc.). These parameters can be changed in real time by the site manager as explained below. For example, sports events usually require higher resolution and frame rate than a system monitoring people paying at a store cashier; a parking control system requires lower resolution for recognizing presence of a car, but higher resolution for reading its license plate; etc. As explained below, all these parameters and degrees of freedom are used by the site manager in real-time to place the network at the best operational point for a given moment.

Data Rate Series as Random Processes

The data rate of video transmission after compression varies widely. However, the acquired vectors of data values, representing measurements such as camera video capture data rates at multiple moments of time, are not "white noise", that is, there is a dependency or correlation between different values of the series. Consequently, filtering and prediction methods may be applied to these vectors to remove random noise and to predict (i.e., forecast) future values of the series based on past and current values. As more information is acquired on the data series and their statistical properties, the prediction accuracy improves. This may include, for example, using "side information" to improve prediction, for example real data and control from other systems, such as video analytics and internet-of-things (IOT) data described further hereinbelow. An example can be for "seasonal statistics", whereby the operation of a predictor depends on the current environment state. For example, the momentary required data rate from a camera at a street intersection may change according to the number of passing vehicles, such that it has one statistical properties when the traffic light is red, and another when the traffic light is green. Getting an indication from the traffic light control system regarding the actual state of the light (red/green) may switch the prediction engine from using one set of underlying statistics to another, thus achieving a significantly better estimation than if one set of statistics is used for all predictions.

As described above for the video capture data rate (after compression), also the transmission bit rates from each camera to the base-station/access-point, as well as the overall supported bit rate or the network (channel bandwidth), both in uplink and in downlink may be modeled as random variables (RVs), conducive to similar methods of prediction. Channel conditions and hence momentarily supported channel bandwidths also vary with time. This results from varying physical conditions, e.g. fading, device mobility, together with design factors, e.g. rate-selection mechanisms of the wireless technology (e.g. cellular, WiFi).

System Parameters Database

In some embodiments, system requirement parameters are preset in the site manager parameter database, though changes may be made over time, manually or automatically, to accommodate the requirements and capabilities of the system. This includes for example the allowed latency for each video stream. For example, live streams may require low latency, recorded streams may permit higher latency, while "PTZ" streams may require very low latency. The preset parameters include a "video quality list" for each camera, as well as dependencies, i.e., if video quality is compromised at a certain camera, which camera to choose.

As stated below, prediction and management is performed according to the most up-to-date snapshot of the parameters database, possibly together with knowledge of past data, as well as prediction of future data (e.g., an edge or centralized VA based indication may give prior knowledge before moving an edge-device from "record-stream" to "Live-stream"). In further embodiments, the system parameters database may be distributed at the monitoring/storage/control units.

System Control Transmission Protocols

FIGS. 2A and 2B indicate respective asynchronous and a synchronous transmission control protocols 30A and 30B, according to embodiments of the present invention. In order to report all real-time measurements from edge devices to the site manager, as well as to transmit control parameters from the site manager to the edge devices, a system transmission control protocol is used.

In the asynchronous protocol, indicated in FIG. 2A, the down-link (DL) management frame indicates to the one or more edge devices all needed system parameters, followed by up-link (UL) data frames from the one or more edge devices, including video and/or audio streams, together with status reports that include real-time measurements of edge device operating parameters. These parameters include video frame rates, transmission rates, buffer loads, such as free storage space and amount of data moved to a buffer (i.e., storage) since a prior transmission.

In the synchronous method, indicated in FIG. 2B, the time axis is divided into "super-frames", each consisting of a DL management (MNG) frame indicating to the edge devices all needed system parameters, followed by UL data (i.e. video) frames together with status reports from each edge device. Super-frame size may be set and/or changed manually or automatically and may be fixed or varying over time. All edge-devices or only some edge-devices may transmit in every super-frame. One example is that all devices with "live-streams" transmit in every super-frame, while all devices with "recorded-streams" transmit in a best-effort manner (e.g., using the priority between them, round-robin, and/or measured time from last transmission to provide bounded latency) in the remaining time of each super-frame. Management and allocation within the super-frame is done by the site manager.

A combination of synchronous and asynchronous control protocols is also possible. For example, the super-frame may be applied for part of a best-effort asynchronous communications protocol, e.g., for admissions control, that is, for joining or leaving the network, and other less time-critical signaling.

The data stream and the control stream may be two different streams, and may be transmitted over one channel or two different channels (or even via different media).

FIG. 2C illustrates an example of a message flow 32 between a site manager ("manager") and edge devices ("Agents"), according to an embodiment of the present invention. A first mapping messaging (the "MNG Frame" described above) is generally broadcast from the site manager to all agents. The agents in turn send their status reports sequentially. Subsequently, the site manager sends a second request, and so on. FIG. 2D-2F illustrate a set of examples of fields that may be included in the messages between the edge devices and the site manager. FIG. 2D illustrates an exemplary mapping message structure 34A. illustrates an exemplary node control structure 34B, which is part of message structure 34A. FIG. 2F illustrates an exemplary status message structure 34C.

Prediction and Management Engine

The Prediction and Management Engine of the site manager acquires the status messages, from the edge devices, including real-time video capture rates and transmission rate measurements, as well as buffer load parameters and timing, and additional status information described further hereinbelow. The Engine then determines control settings for managing the network of video cameras in real-time to ensure that the limited bandwidth is sufficient to handle all edge device transmissions. Prediction of future captured video rates of the edge devices, of future communications rates of the edge devices and of the future channel communications bandwidth is done based on real-time measurements of these and other parameters.

Prediction can also be done at the edge devices (i.e. cameras or connected devices) and based on measurements done locally. Alternatively, edge devices may perform measurements and send reports to the site manager which performs the prediction. Additional examples of measured and predicted data include:

Compressed video bit-rate at each camera/edge-device, when using variable bit rate (VBR) compression, as well as constant bit rate (CBR) when changing cameras and/or compression parameters.

The supported bit-rate by the communication system from each camera/edge-device to the base-station/access-point (UL) and from the base-station/access-point to each camera/edge-device (DL).

The overall supported bit-rate by the communication channel in the UL and in the DL.

The prediction of different data may be done independently or in a joint-manner. Prediction may use different prediction methods and underlying statistics for each sequence of predicted data, as described further hereinbelow. Prediction algorithm input may be based not only on statistical properties of the actual measured and predicted data, but also on known data and indications from other elements of the system, including output from video analytic engines and IOT devices. Input also may include the system requirement parameters described above.

Based on the measurements and/or the predictions, the site manager sends controls to the edge devices and to the monitoring, storage and control units to perform real-time system management. For example, when using synchronous transmission control protocols, the site manager may control:

The amount of data to be sent by each edge device in each super-frame of a synchronous communication The timing of sending the data from each edge device in each super-frame Other behavior parameters of each edge device, including quantity and timing of video buffering in local data storage, video/compression parameters, frame rates, video capture resolution, etc.

Construction and format of a downlink management (MNG) frame in each super-frame The amount of data sent in each super-frame, divided by the super-frame duration correlates to the actual (and possibly changing) data rate for each device in each super-frame. A numerical example for this case is as follows. Assume a system with the following parameters:

Synchronous management, as described further hereinbelow 5 cameras, 1 base-station a super-frame duration of 200 ms.

Momentary predicted required data rates of the 5 cameras are: 100 kbps, 200 kbps, 300 kbps, 400 kbps, 500 kbps. These numbers are predicted based on past and present measured and reported required data rate values, together with possible "side information" as explained above.

Momentary predicted supported up-link (UL) communication data rates of the 5 cameras to the base-station are: [1 Mbps, 2 Mbps, 3 Mbps, 4 Mbps, 5 Mbps]. These numbers are predicted based on past and present measured and reported supported UL communication data rates values, together with possible "side information" as explained above.

Momentary predicted supported down-link (DL) communication data rates of the base-station to each of the five cameras are: 1 Mbps, 2 Mbps, 3 Mbps, 4 Mbps, and 5 Mbps respectively. These numbers are predicted based on past and present measured and reported supported DL communication data rates values, together with possible "side information" as explained above.

Corresponding with this super-frame the following management decisions can be made:

The DL management frame (broadcast) shall use 1 Mbps rate (so all cameras can receive it)

The UL data frames will consist respectively 20, 40, 60, 80 100 kb (resulting from multiplying the rate by the super-frame duration)

The time duration of each UL frame can be calculated by dividing its size (as given above+additional protocol overhead) by the UL data rate used (e.g., for camera1 this will be (20 kb+[overhead] kb)/1 Mbps).

Similarly, the time duration of each UL status frame can be calculated by dividing its size (known based on the protocol used) by the UL data rate used (e.g., for camera1 this will be ([known size] kb)/1 Mbps).

Based on the time duration of each UL frame, the starting transmission time can be calculated and indicated to each camera (e.g., camera 2 shall commence transmission T [sec] after the beginning of the super-frame, T can be calculated as [MNG time]+[cam1 data-frame time]+[cam1 status frame time]+[additional guard interval used for safety]. The MNG time can be calculated as given above based on the known amount of data in this frame (protocol dependent) and the chosen DL rate.

Additional indications can be sent in the MNG frame to each camera based on the results of the calculations above (e.g., if the overall time used by all UL frames exceeds a certain percentage of the super-frame, this may indicate a possible problematic situation, and one or more cameras can be indicated to reduce their data rate by e.g., reducing resolution, frame-rate, or changing compression parameters).

If, a few seconds later, all communication parameters/predictions stay the same as above but there is movement in the scenes captured by camera 4 and camera 5, causing a higher requirement for the video transmission rate from these cameras. Predicted required data rates of the five cameras are: 100 kbps, 200 kbps, 300 kbps, and 2 Mbps, and 2.5 Mbps. These numbers are predicted based on past and present measured and reported required data rate values, together with possible "side information" as explained above.

Correspondingly, the following management decisions can be made:

DL management frame (broadcast) shall use 1 Mbps rate (so frame can be received by all cameras).

UL data frames will consist respectively of 20, 40, 60, 400 and 500 kb (resulting from multiplying the rate by the super-frame duration).

The time duration of each UL data frame can be calculated by dividing its size (as given above+additional protocol overhead) by the UL data rate used (so that, for example, for camera 1 this will be (20 kb+[overhead] kb)/1 Mbps).

Because the time duration for sending UL data frame of all cameras now clearly exceeds the entire super-frame duration, the prediction and management engine needs to make a decision to reduce the overall required time. This can be done by several means, for example indicating to one or more cameras not to transmit the data in this super-frame (but in a future super-frame, that will be more available, by that creating "delay" in this camera's video stream), indicating to one or more cameras to send data using a lower required data rate (this can be done by using lower resolution, lower frame rate, different compression parameters, etc.). In this case prediction of such situation before it actually happens is usually required to indicate to the cameras to prepare the new required video-streams in advance (e.g., use transcoding, change camera settings, etc.).

Based on the above decisions, the new time duration of each UL data frame can be calculated by dividing its new size (as given above+additional protocol overhead) by the UL data rate used (e.g., for camera4, choosing a new lower data rate of 1 Mbps, this will be (200 kb+[overhead] kb)/4 Mbps).

Similarly, the time duration of each UL status frame can be calculated by dividing its size (known based on the protocol used) by the UL data rate used (e.g., for camera1 this will be ([known size] kb)/1 Mbps).

Based on the time duration of each UL frame, the starting transmission time can be calculated and indicated to each camera (e.g., if camera 1 is chosen to transmit in this super-frame, camera 2 shall commence transmission T seconds after the beginning of the super-frame; T can be calculated as [MNG time]+[new camera 1 data-frame time]+[cameral status frame time]+[additional guard interval used for safety]. The MNG time can be calculated as given above based on the known amount of data in this frame (protocol dependent) and the chosen DL rate.

Additional indications can be sent in the MNG frame to each camera based on the results of the calculations above (e.g., if the overall time used by all UL frames exceeds a certain percentage of the super-frame, this may indicate a possible problematic situation, and one or more cameras can be indicated to reduce their data rate by e.g., reducing resolution, frame-rate, or changing compression parameters).

Similarly, when control signals are transmitted by asynchronous transmission control protocols, the site manager may determine:

The amount of data to be sent by each edge device in response to the management (MNG) DL frame.

Other behavior parameters of each edge device, including quantity and timing of video buffering in local data storage, video/compression parameters, frame rates, video capture resolution, etc.

Construction and format of the DL management (MNG) frame.

In this case, for each end-device, the amount of data sent in response to the management (MNG) DL frame, divided by the duration between consecutive MNG frames to the same end-device, correlates to the actual (and possibly changing) admitted data rate for each device in this time-window.

Management decisions are based (together with the collected data) on the system parameters database as well as a prediction engine which ensures that all management decisions are done a-priori (and with sufficient "margin" such that even if the prediction is biased, the system maintains robust performance. The tradeoff between system margin (i.e. robustness) and available bandwidth utilization efficiency can be chosen manually or automatically.

Prediction may be performed based on the underlying generating models of both video and communication as well as the actual observations (e.g., using Kalman filtering, extended Kalman filtering, etc.). Generating models may change over time for each edge device based on collected information. Required prediction intervals may be set and/or changed manually or automatically.

Network Management Algorithm

Figure 3:
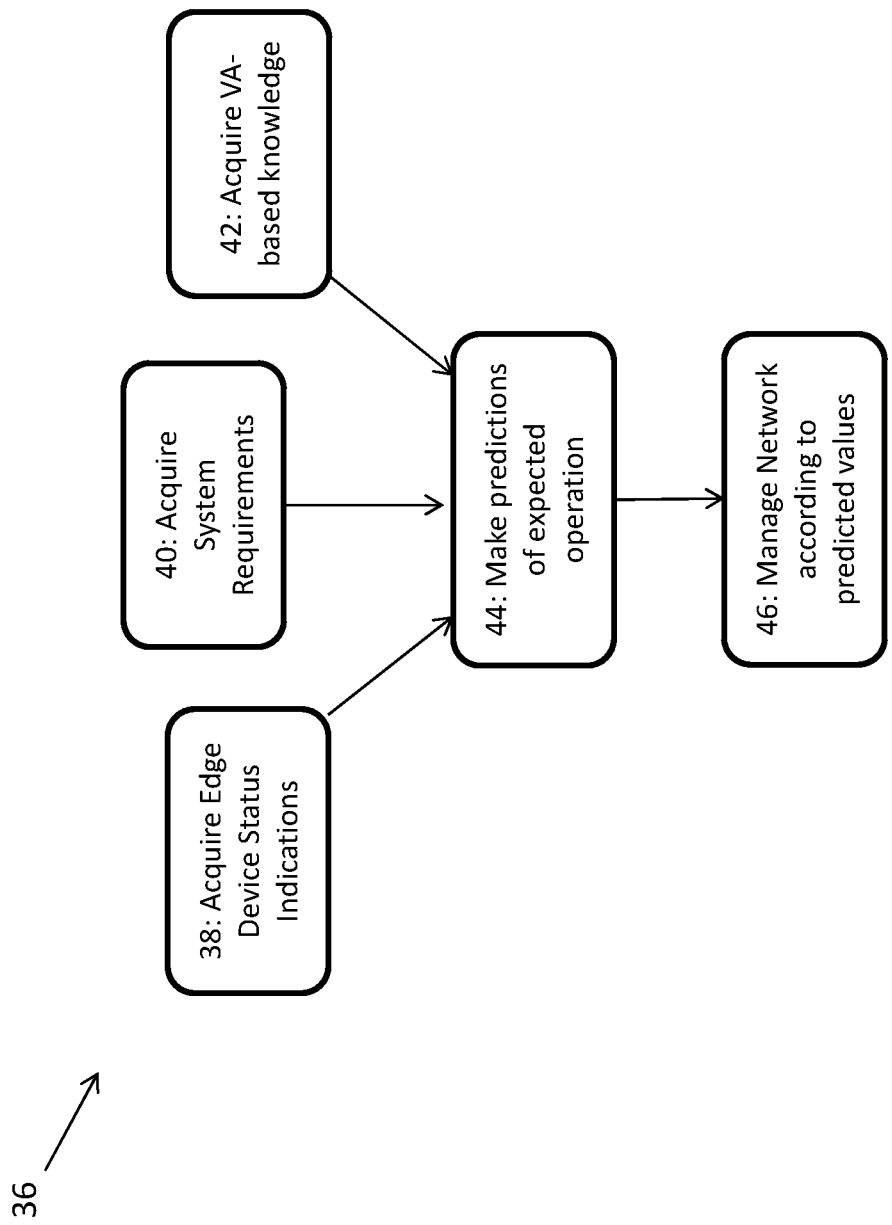
FIG. 3 is a flowchart of a process for real-time, predictive, video network management, in accordance with an embodiment of the present invention.

FIG. 3 is a flowchart of a Network Management Algorithm process 36 implemented by the Prediction and Management Engine for real-time, predictive, video network management, in accordance with an embodiment of the present invention. At a step 38, the engine acquires from all the edge devices their current state data, including capture rates, transmission rates, error rates, buffer loads (i.e. how full the buffers are). At a step 40, the engine also receives the system requirements, including: required/possible quality for each camera, which cameras are in live view/recording/currently being used by PTZ, etc. At a step 42, the engine may also receive indications and requirements from a video analytics system, which provides data that is based on analysis of video content, such as movement of objects recorded in the video (e.g., motion detection, which may be performed in the camera, which then provides an indication of the detected motion to the site manager). Based on these inputs, the prediction and management engine performs, at a step 44, a predictive analysis of future values of at least one of: (1) future captured video rate data of edge devices; (2) future communications rate data of edge devices; and (3) future channel supported rate of transmission.

At a step 46, based on the predictive analysis, the engine decides and sends control messages indicating:

Edge device ("EU"/camera/dongle) transmission control—timing and parameters of edge device transmission Edge device ("EU"/camera/dongle) operation control—settings for specific cameras or change processing or compression parameters (e.g. compression, frame rates, resolution, buffering, etc.).

Control messages from the engine (as executed by the site manager) may set a transmission rate or a future transmission rate between at least one edge device and the base station. The selected edge device may be determined by a priority ranking, which may be pre-set according to the "video quality list" described above, or according to a signal from a human manager or a signal from one of an Internet-of-Things (IOT) device or a Video Analytics (VA) system.

The determination of the transmission rate is also a function of the required parameters described above, including allowed quality, allowed resolution, allowed delay, allowed frame rate, allowed compression factor, and allowed area of a scene of each of the edge devices (i.e., video cameras). (Required parameters may be updated in real time by a human manager or automatically by input from an IOT device or a VA system.)

Setting the transmission rate may include setting or changing a parameter of a video stream from an edge device, such as a delay, a quality, a resolution, a frame rate, a compression factor, and an area of a captured scene. Reducing or increasing the parameter may be limited by a preset allowed limit of the parameter. Delaying transmission may require storing a portion of a video stream locally at the edge device before the portion is transmitted. This may be stored at a dongle described below. The control messages (also referred to herein as signals) may be to store a higher or lower quality video. The selected areas of interest for each of the video cameras may be defined by a user or selected automatically according to a function based on priorities between areas or selected by a video analytics algorithm, as described further below.

Edge Device Architecture

The edge device includes the following logical units:

Video capture system (receiving data from image sensor)

Video processing and compression unit

Buffering and EU control

Communications unit

Figure 4A:
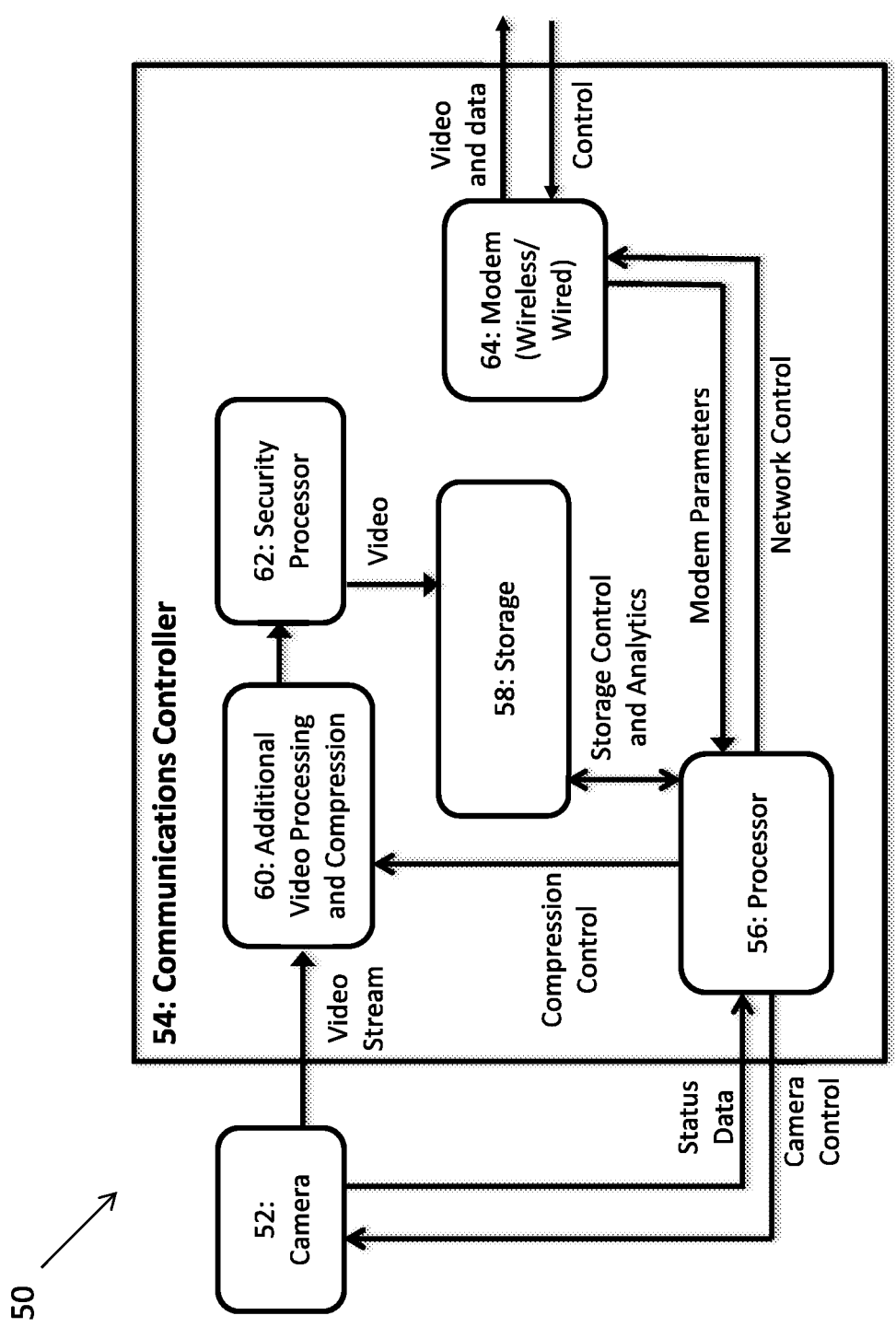
FIGS. 4A-4C illustrate several options for the architecture of edge devices, according to embodiments of the present invention.
Figure 4B:
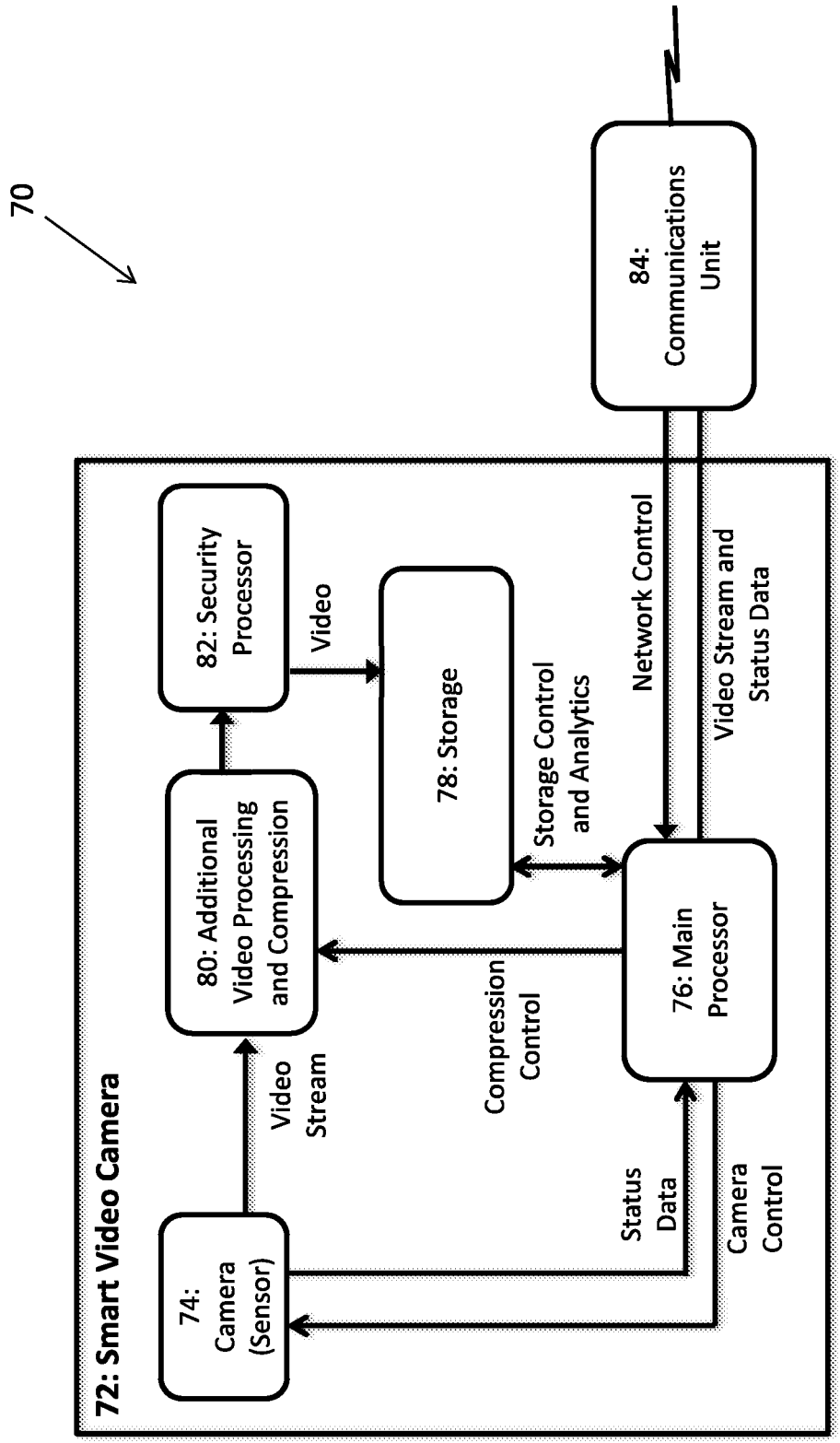
Figure 4C:
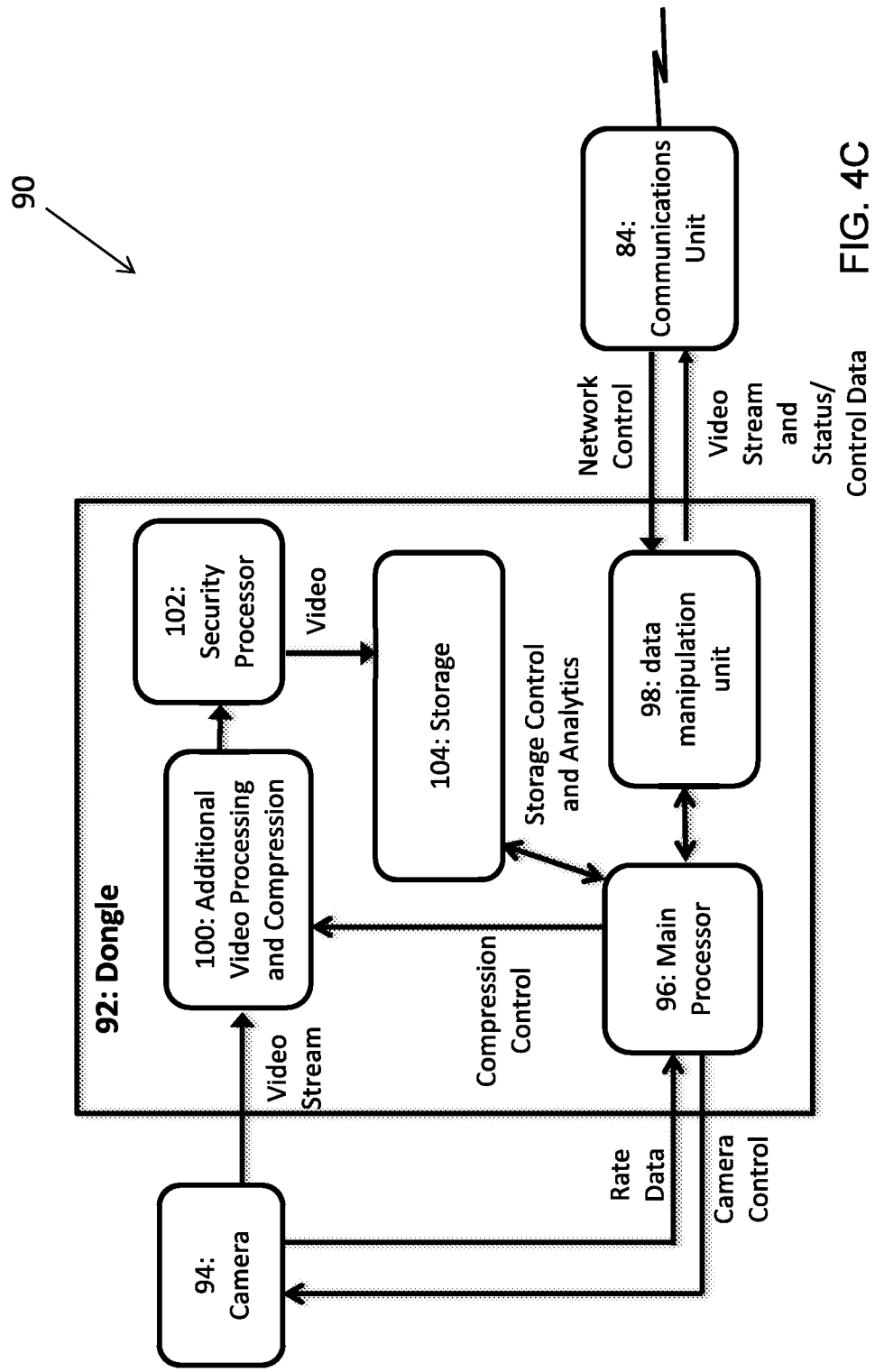

FIGS. 4A-4C illustrate several options exist for the architecture of the edge device, according to embodiments of the present invention. These options indicate how the different logical units may be integrated into physical units at the edge device.

FIG. 4A illustrates an edge device 50, in which logical units described above are embedded into a communications controller 54. A processor 56 of the communications controller receives status data from a camera 52, which in turn receives from the processor control signals to set parameters such as resolution and bit rates. The communications controller may also include a unit 60 for additional video processing and compression of the camera video stream, a security processor 62, storage 58, and a modem 64, which communicates video and status data to the base station and in turn receives control signals.

FIG. 4B illustrates an edge device 70, in which logical units described above are embedded into a smart camera 72. A processor 76 of the camera receives status data from an internal camera sensor 74, which in turn receives from the processor control signals to set parameters such as resolution and bit rates. The smart camera may also include a unit 80 for additional video processing and compression, a security processor 82, and storage 78. The processor communicates video and status data to the base station and in turn receives network control signals from an external communications unit 84.

FIG. 4C illustrates an edge device 90, in which logical units described above are embedded into an external dongle 92. A processor 96 of the dongle receives status data from a camera 94, which in turn receives from the processor control signals to set parameters such as resolution and bit rates. The controller may also include a unit 100 for additional video processing and compression, a security processor 102, and storage 104. The processor communicates video and status data either directly to the communications unit 84 (as described above with respect to FIG. 4B) or may first communicate with a data manipulation unit 98.

The data manipulation unit performs tasks such as handling multiplexing of video and control data, generating quality of service (QoS) indications/settings, and IP packet preparation (e.g., encapsulation into larger packets to enhance efficiency). Long IP packet encapsulation may be done to enable more efficient transmission over the communications system. The network may be configured such that setting the QoS indication to a high value results in higher transmission efficiency over the network, as well as precedence over other devices in the network.

The video processing and compression unit may enhance video processing and compression done in the camera. The advantage of the option of a dongle is that it can be used with existing, "off the shelf" cameras and communication systems. In this solution, the connection to the camera as well as to the communication unit can be over IP, e.g., Ethernet connection. The dongle may be adapted to perform at least one of: transmitting an instruction to the video camera; performing a transcoding operation on a video stream transmitted from the video camera; locally storing a portion of the video stream; delaying transmission of a portion of a video stream sent by the video camera, or transmitting a video stream over the shared communications channel. The storage of the dongle is used to buffer video data. The security processor may add security capabilities to provide wire-like safety for the video transmission including encryption, authentication, etc.

Local Storage and Management

Local storage and management at the edge device may be performed. Local storage supports buffering of data in the edge-device such that the amount and timing of data transmission over the communication network can be controlled by the manager (see below) ensuring that the amount of data transmitted over the channel by all edge-devices shall not exceed the supported communication rate on the one hand, and without losing information, on the other hand. Furthermore, local storage also supports situations in which a lower rate video stream (e.g. using different compression parameters) is transmitted in real-time (or near real-time), while a higher rate video stream may be transmitted later, or even stored locally at the edge-device and retrieved only if/when needed. Another use for local storage is as a safety mechanism (together with fallback mechanisms as stated below) in case of data loss over the communication network (supporting re-transmission if so requested).

Local management of the storage/buffering scheme (incl. buffer size etc.) is done based on parameters received form the manager, together with local measurements of the video data rate, communication rate and other system parameters.

In some cases more than one video stream may be stored and processed at the edge-device corresponding to a single camera video-capture (e.g. corresponding to different video parameters such as resolution, refresh rate, and compression) or to several cameras.

Additional Video Data Processing

In some cases, additional video processing may be performed, e.g. at the edge device between the video compression output and the communication system. This is of interest especially if the edge-device consists of separate modules (e.g. from different vendors) such as an off-the-shelf camera and communication box and a special "dongle" which connects the two and allows for implementing the solution using "standard" boxes. One example is changing the compression parameters by transcoding (i.e. video de-compression, processing, and re-compression) without directly controlling the video camera. In some cases, when the solution is implemented with a single box in the edge, video processing can be performed using the video processor of the camera. Video data processing may include compression, transcoding, area-of-interest based compression, and more.

Optimization at Edge Devices

Overall network efficiency and hence performance is increased by buffering at each edge-device, while conveying to the site manager the status of the momentary buffer states, video quality requirements, and data rate requirements. Setting the size of the buffer and the data rate of the modem (which may be constant or variable) is crucial to the performance of the system, which may be optimized by accounting for the following factors:

Buffer overflow probability—the data rate may be increased or quality reduced to reduce overflow probability Statistical correlation/dependency over time (i.e., how strong is the correlation between statistics in one instant and the next, what is the time duration between consecutive measurements and decisions, etc.)

Complexity and cost (e.g., buffer size, VBR/CBR, indication of buffer fullness etc.)

Latency (e.g., for "Live-streams", "Record-streams", "PTZ-streams")

Heuristic methods may be applied to set the above factors to reduce bandwidth bottlenecks.

Graceful Degradation

The management algorithm of the Prediction and Management Engine may be configured to deal with catastrophic events, for example, when the overall system supported rate falls below the required data rate. For each edge device, or edge unit (EU), according to its preset parameters and priority in the network (e.g., Live/Recording, etc.) there is a sorted table of possible configurations, from $Q_{max}$, the highest quality, which allows the highest data rate, to $Q_{min}$, the lowest allowed quality and data rate. Factors that can be set include allowed compression parameters, video resolution, and frame rates.

If the highest desired mode cannot be supported, and based on the current significance of the EU in the system, a lower data rate configuration is set. This is done in real-time and affects all EUs such that the overall supported data rate can handle all EUs.

In catastrophic events, the parameters may be set to allow a momentary quality degradation of the least important video streams so that the important video streams continue to flow at the required rate.

Fallback Mechanisms

Fallback mechanisms are in charge of ensuring robust operation even in extreme ("corner case") situations. This includes, e.g. prediction bias, or momentary severe conditions which may occur with very low probability (e.g. very deep communication fade, or when all cameras require very high-data rate). In such case, the fallback mechanism may reduce transmitted data rate from one or more cameras (e.g. by compromising quality) while higher quality data is stored locally at the edge to be retrieved at later time. Another option may include "soft-switching", i.e. moving one or more edge-devices to other networks (cells or BSS's for Cellular and WiFi) or Radio channels (AFS—automatic frequency selection, see below). These fallback mechanisms can be used not only in corner cases but also as a means to moderate system fluctuation. Control and management of these mechanisms is done by the prediction and management engine.

Multiple Cell Management

In addition to single cell management and optimization, also multiple cell management can be incorporated. This is important in cases where all edge devices or units (EUs) in the cell are of high importance, and might require high data rates that cannot be (momentarily) supported by the communications system. Forming communications in a new frequency channel that may coexist with other frequencies simultaneously is considered to be forming a new cell. Multi-cell mechanisms may include the following (alone or in combination):

AFS—automatic frequency selection with migration to a better or cleaner channel.

Dual band operation—support of more than one frequency band, e.g., 2.4 GHz and 5 GHz and also incorporation of 900 MHz radios. Automatic frequency selection between the different bands is done based on signal quality and channel availability.

Migration between physical cells based on demand and capacity—EUs may automatically migrate ("roam") to different cells based on their and other EUs data rate demand, their physical location and the available data rate of each cell.

EU communications over multiple cells—EUs may communicate with multiple base stations.

All frequency decisions may be done by the manager based on indications (i.e., status data) from all EUs, and may be in turn communicated to the EUs.

Area of Interest Control

In many situations only a subset of the entire video scene captured by the camera is of interest, or alternatively different regions may have different importance or video (e.g., resolution, quality, refresh rate) requirements.

In this case all methods described above my be performed independently on different areas of the video stream, including e.g., transmitting (always or in some cases) only a subset of the full scene. In this case video processing methods such as spatial/temporal prediction, smoothing, and known past-information may be used to complete or enhance the full image. This can be done (always or when needed) at the central management unit without putting burden on the communication system.

Video-Analytics Methods and Co-Operation with Video Analytics Systems

All mechanism described herein may take advantage of video-analytics (VA) methods and algorithms. These can be edge-based (e.g., identifying or predicting events at the edge, and making local decisions at the edge-device regarding data, camera/video control, data-storage, measurements) or centralized (e.g., connecting the prediction and management engine to a VA system, using some VA-based knowledge or decisions, possibly based on more than one video-stream or camera, as input to the prediction and management algorithm), or a combination of both.

The VA system may work in co-operation with the prediction and management engine. Two examples for cooperation with VA systems are given below.

A traffic or parking control system may use a low-resolution (or lower quality) video stream enabling the VA system to recognize existence of a vehicle in the frame, while using a low-bitrate stream. When the VA system recognizes a vehicle, it indicates to the management engine (and the parameter database) to switch to a higher resolution/quality (either for all the scene or only an area-of-interest, as explained above), allowing the VA system to read the license plate. Once this is done, it indicates to the management system that the lower resolution/quality and low-bitrate stream may be used.

A second example may be a camera observing a road (or a pavement or a running lane, etc.). When "nothing is happening" a lower bit-rate can be used. Once an object enters the frame, VA methods are used for recognition and/or estimation of the object's speed and direction. Based on these estimates, including prior knowledge, a decision on the required quality/bit-rate, as well as the amount of time the object will remain in the frame is made, and the decision is passed to the management engine (and the parameter database) to switch to a higher resolution/quality (for all the scene or only area-of-interest, as explained above).

In both of the above cases, the higher-data rate is used only when actually required, and for only the amount of time (or area of image) actually required. Using this method dramatically reduces communication resources, and results in even higher robustness, range and camera support.

Co-Operation with IOT Systems

All mechanisms described herein may take advantage of indications (i.e., status data) from available IOT devices. One example may be connecting the prediction and management engine directly to a "smart traffic light", receiving an indication if the light is red or green, and managing and/or allocating bandwidth to specific cameras based on the traffic-light condition as indicated. To some extent this information may also be learned via VA systems as described above.

Protection and Methods for Dealing with Lost and/or Erroneous Frames

Without prediction-based network management, a network may rely on CBR, such that the camera transmission rates are relatively constant. However, the varying nature of the channel bandwidth may cause transmission failures. On the other hand, if VBR is used, the mean overall bit rate may be reduced, but momentary bit rate peaks (resulting from the stochastic nature of the captured video) may not be supported by the communication network, adding to the problem of the varying channel bandwidth. In a real-time video system, this may result in loss of video data, resulting in "black screen" effects that may not be acceptable.

With prediction-based network management, such losses are minimized. Nevertheless, losses may still occur when the management and prediction engine cannot react quickly enough to changing conditions, leading to a need for additional management functions. Lower layers of the communications protocol stack provide some error protection. (Wi-Fi uses PHY: MCS selection and FEC. MAC has ACK frames and retransmission. Higher layers include rate selection protocols.) However, when there is bandwidth congestion there is still some probability that important frames of streaming video will be lost, i.e. will not reach their destination. This includes both video data frames and protocol frames (e.g., MNG and STATUS blocks, as described above).

In some situations, higher layers, such as the transport layer, can be used to deal with these situations, such as TCP. However, usually UDP is preferred as a transport layer for streaming video because of the greater efficiency. The problem is more severe when some frames from edge devices are directed to one entity while others are sent to other entities. As indicated in FIG. 1, video data is sent to the monitoring, storage and control units while control and status indications are sent to/from the site manager. Furthermore, it is possible that knowledge on dropped (or erroneous) data frames, may be gathered only after decoding the data frames (e.g., de-compression of video frames).

Several solutions are provided by embodiments of the present invention, as follows.

Direct Signaling may be implemented from the monitoring, storage and control units (e.g., video management systems) to the site manager if frames arrive incorrectly. These indications are taken into account by the site manager and influence its decisions, e.g., requesting retransmission, reducing communication transmission rates if issue persists. This scenarios is indicated by the communications between the site manager and the monitoring, storage and control units illustrated in FIG. 1. As noted in Fig. video/data error and lost frames handling are implemented in both the site manager and the monitoring, storage and control units.

Figure 5:
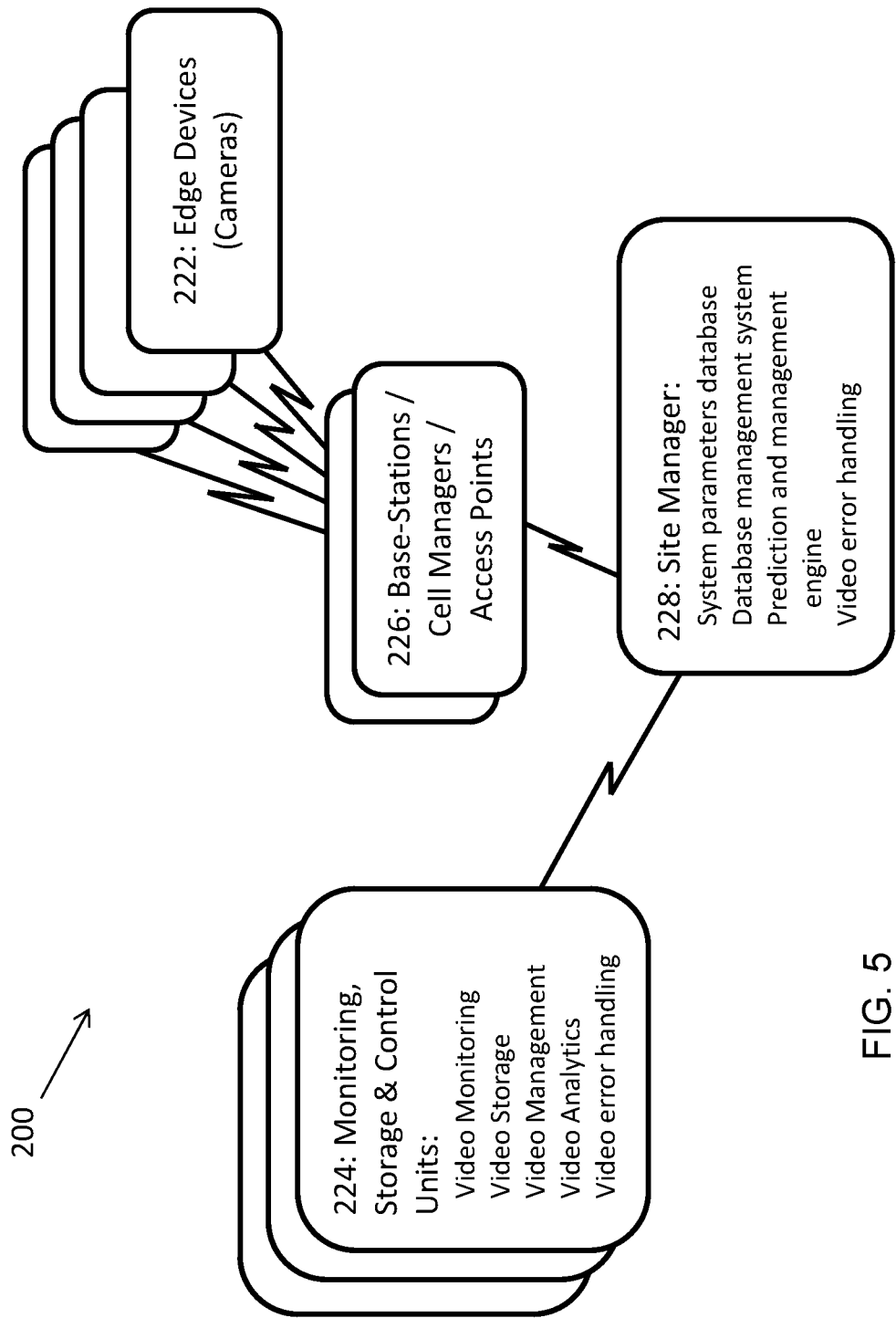
FIG. 5 is a schematic, pictorial illustration of a system for real-time, predictive, video network management, whereby all video and data frames from edge devices are sent through a site manager before reaching monitoring, storage and control units, according to an embodiment of the present invention.

Pass-through, encapsulation and forward error correction (FEC) as illustrated in FIG. 5, whereby all video and data frames from edge devices 222 are sent through a site manager 228, before reaching monitoring, storage and control units 224, according to an embodiment of the present invention. The site manager decapsulates the frames, and detects/corrects the errors (or lost frames) without a need to de-compress the actual video.

The knowledge gathered by the site manager in this process (e.g., errors, lost frames, and their statistics) is taken into account by the site manager and influences its decisions, e.g., requesting retransmission, reducing communication transmission rates if issues persist.

The knowledge gathered by the site manager in this process (e.g., errors, lost frames, and their statistics) is indicated to the monitoring, storage and control units (e.g., video management system, VMS) which may in turn improve its performance dramatically by making use of this information (e.g., if the video decoder knows in advance that a video frame is missing or erroneous it may use some known recovery methods, or some methods given below).

When video frames are found to be missing or erroneous, recovery steps may include frame buffering and estimation. A previous known video frame instead of, or together with, a current (possibly erroneous/missing) video frame can be used to estimate lost data. Alternatively or additionally, spatial and/or time interpolation, smoothing, and prediction methods can be applied based on past data and/or neighboring available video data. These method can also be used for preventing a blocking effect when a portion of the frame is missing/erroneous or is recovered by the above methods.

A request to refresh, that is, a request to one or more cameras/encoders to refresh the video stream can also be issued by the site manager. (For example, based on H.264 a request can be made to send an i-frame, to prevent error propagation.)

The above methods can be used in combination as required. Furthermore these methods can alternatively be done in the monitoring, storage and control units (e.g., the video management system, VMS) or in the site manager or in a combination of both (e.g., monitoring, storage and control unit uses a frame buffer which resides in the site manager).

FIGS. 6A and 6B illustrate respective examples of a video packet 300 without encapsulation and a video packet 310 with encapsulation for error handling. An encapsulated packet may include a preamble (EHPr) and/or an ending (EHPo) block added to the unencapsulated packet, which may be used to determine transmission errors.

Jitter/Delay Management and Application Based MAC

Embodiments of the present invention may operate over various wireless technologies, such as WiFi or cellular. In some technologies (e.g., including many WiFi products) QOS requirements, and especially delay/jitter are not well supported. In such cases when the underlying wireless protocol does not natively provide sufficient quality, higher layer methods can be implemented. Furthermore, because devices from different vendors may operate slightly differently in the same scenario, further methods including manual or automatic fine-tuning may be used.

Pre-Transmission of Frames.

When sending a frame in a wireless transmission, the time between sending until it is actually transmitted over the air may vary (in time or between vendors). Consequently, the sending device may pass the frame to the wireless modem in advance such that the actual transmission time is as required. The amount of time ("pre-transmission time") may be fine-tuned manually or automatically at system startup, and configured into the system, or may be measured, calculated or predicted based on collected data during operation. One method for automatic measurement may use TIME-STAMP signaling within the transmitted frame (i.e., indicating inside the frame the time it was passed to the wireless modem). This gives the receiving device the possibility of measuring the time gap between the sending time and the receiving time, which in turn can be used to calculate and set the "pre-transmission time" for each device connection. These values may differ from device to device and also may change in time.

Clock Synchronization of Network.

This method may be used in combination with the above method or separately to allow measurement, correction and management of transmission times and reduce jitter/delay as required.

Using Underlying Available Methods.

Some methods from lower layers are available to be set by the higher layer which can improve QoS and reduce Jitter/delay. For example setting access categories and CW values in WiFi modules supporting 802.11e standard can be used to improve QoS and reduce Jitter/delay as well as to give different priority to different devices in the network (e.g., give precedence to the site manager over cameras).

Application-Based MAC.

When the media access control (MAC) of the underlying wireless technology gives insufficient quality-of-service (QoS), a higher layer "application based MAC" can be used. Using this protocol together with the methods described above may result in a managed (or almost managed) network by the site manager even when the underlying technology (e.g., WiFi) is unmanaged (e.g., using distributed channel access, e.g., CSMA-CA). In this case although the underlying technology is unmanaged, the application level software at the edge device is configured to send frames to the edge device wireless modem, to be transmitted only at moments set by specific indication of the ("application level") network manager (i.e. site manager). By this method of configuration, the network, though operating over non-managed wireless technology, operates in practice as a managed network.

Prediction Methods

FIGS. 7A and 7B illustrate statistical functions—a probability density function (PDF) 400 and cumulative density function (CDF) 410—indicative of the type of data sets that may be used for predictive modelling of data rates for network management, according to embodiments of the present invention. Data sets used for modelling may be built from the multiple types of data that the prediction and management engine subsequently acquires and predicts for network management. These data sets include data capture rates (after compression) from edge devices, transmission rates, channel bandwidth supported rates, and "side information", such as video analytics and internet-of-things (IOT) data.

Prediction modelling is based on statistical techniques employing time series, cross-sectional or longitudinal data. Modelling may include generalized regression models as well as machine learning methods. As described above, prediction may use Kalman filters, such as a minimum-variance Kalman filter, or a stepwise linearization with the Extended Kalman Filter, as described in Julier, S. J., Uhlmann, J. K. (2004), "Unscented filtering and nonlinear estimation", Proceedings of the IEEE, 92(3), 401-422.

Further examples include last period demand, simple and weighted N-Period moving averages, simple exponential smoothing, Poisson process model-based forecasting and multiplicative seasonal indexes, GMDH neural networks, Single Exponential Smooth, Double Exponential Smooth, autoregressive integrated moving average (ARIMA). A further method is "autoregressive moving average with exogenous inputs" (ARMAX) as described in Ellis, Kimberly (2008), "Production Planning and Inventory Control", Virginia Tech. McGraw Hill, International Journal of Forecasting, 8: 69-80.

Artificial intelligence prediction modelling may include methods of neural networks, support vector machines, machine learning and pattern recognition. Methods may include back-propagation neural networks as described in Li, Rita Yi Man, Fong, S., Chong, W. S. (2017) "Forecasting the REITs and stock indices: Group Method of Data Handling Neural Network approach", Pacific Rim Property Research Journal, 23(2), 1-38.

It is to be understood that the prediction methods described herein are provided by way of example and the systems and methods of the present invention may incorporate other know statistical prediction methods known in the art.

Furthermore, it is to be understood that processing elements of the systems described above can be implemented in digital electronic circuitry, or in computer hardware, firmware, software, or in combinations thereof. Such elements can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media. Examples of storage media include, but are not limited to, magnetic media, optical media, and integrated circuits such as read-only memory devices (ROM) and random access memory (RAM). Each processing device in the system may have one or more processors and may be configured as a multi-processing or distributed processing unit.

Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove. Rather, the scope of the present invention includes variations and modifications thereof which would occur to persons skilled in the art upon reading the foregoing description and which are not disclosed in the prior art.

The invention claimed is:

1. A method for managing video delivery from a plurality of edge devices comprising video cameras, the method comprising:

obtaining data values of parameters indicative of (i) video rates of video streams generated by the video cameras, (ii) transmission rates used for transmitting the video streams from the edge devices in a sequence of frames over a shared communication channel, and (iii) a channel communications bandwidth supportable by the sequence of frames transmitted over the shared communication channel for the video streams;

calculating predicted values of the video rates, the transmission rates and the channel communications bandwidth;

based on the predicted values, (i) detecting that at a given future time, a time duration required for transmitting the video streams using a current configuration of the edge devices will exceed a supportable time duration of the sequence of frames, and (ii) defining an updated configuration of the edge devices that will comply with the supportable time duration of the sequence of frames at the given future time;

instructing the edge devices in advance, at a time that precedes the given future time, to re-configure generation or transmission of the video streams from the current configuration to the updated configuration; and subsequently receiving from the edge devices video streams in accordance with the updated configuration, which comply with the supportable time duration of the sequence of frames at the given future time and therefore comply with the channel communications bandwidth supportable by the shared communication channel.

2. The method according to claim 1, wherein obtaining the data values comprises receiving at least some of the data values from one or more of the edge devices, each edge device coupled to a respective video camera and to a respective modem that transmits a video stream generated by the video camera.

3. The method according to claim 2, wherein calculating the predicted values, and instructing the edge devices to re-configure the generation or transmission of the video streams, are performed at least in part by cloud-based management software that communicates with the edge devices.

4. The method according to claim 2, wherein instructing the edge devices to re-configure the generation or transmission of the video streams comprises instructing an edge device to apply a selected signal-processing operation to a respective video stream, video camera or modem.

5. The method according to claim 1, wherein instructing the edge devices to re-configure the generation or transmission of the video streams comprises buffering a video stream in a buffer coupled to a respective video camera, and controlling one or both of (i) a timing and (ii) an amount of data transmission from the buffered video stream over the shared communication channel.

6. The method according to claim 5, further comprising, while the video stream is buffered in the buffer, transmitting a reduced-quality version of the video stream over the shared communication channel.

7. The method according to claim 1, wherein instructing the edge devices to re-configure the generation or transmission of the video streams comprises modifying an encoding rate, an image resolution or a frame rate of a video stream.

8. The method according to claim 1, wherein instructing the edge devices to re-configure the generation or transmission of the video streams is applied to a selected Area of Interest (AoI) of a scene captured by a video camera.

9. The method according to claim 1, wherein the shared communication channel comprises an uplink of a cell in a cellular network, and wherein instructing the edge devices to re-configure the generation or transmission of the video streams comprises migrating a video camera to transmit a video stream over the uplink of a different cell in the cellular network.

10. The method according to claim 1, wherein instructing the edge devices to re-configure the generation or transmission of the video streams is performed based on information received from a central Video Management System (VMS).

11. The method according to claim 1, wherein instructing the edge devices to re-configure the generation or transmission of the video streams is performed based on an output of a Video Analytics (VA) operation applied to a video stream.

12. The method according to claim 1, wherein instructing the edge devices to re-configure the generation or transmission of the video streams is performed based on information received from a network operator that provides the shared communication channel, or from an Internet-of-Things (IoT) device.

13. The method according to claim 1, wherein instructing the edge devices to re-configure the generation or transmission of the video streams comprises:
providing the data values to a management node, and also passing the video streams via the management node; and
processing the video streams by the management node.

14. A system for managing video delivery from a plurality of video cameras, the system comprising:
a plurality of edge devices, which are coupled to the video cameras and to respective modems that transmit the video stream generated by the video cameras in a sequence of frames over a shared communication channel; and
a processor, configured to:
obtain, at least from the edge devices, data values of parameters indicative of (i) video rates of video streams generated by the video cameras, (ii) transmission rates used by the modems for transmitting the video streams in the sequence of frames over the shared communication channel, and (iii) a channel communications bandwidth supportable by the sequence of frames transmitted over the shared communication channel for the video streams;
calculate predicted values of the video rates, the transmission rates and the channel communications bandwidth; and
based on the predicted values, (i) detect that at a given future time, a time duration required for transmitting the video streams using a current configuration of the edge devices will exceed a supportable time duration of the sequence of frames, and (ii) define an updated configuration of the edge devices that will comply with the supportable time duration of the sequence of frames at the given future time;
instruct the edge devices in advance, at a time that precedes the given future time, to re-configure generation or transmission of the video streams from the current configuration to the updated configuration; and
subsequently receive from the edge devices video streams in accordance with the updated configuration, which comply with the supportable time duration of the sequence of frames at the given future time and therefore comply with the channel communications bandwidth supportable by the shared communication channel.

15. The system according to claim 14, wherein the processor is configured to instruct an edge device to apply a selected signal-processing operation to a respective video stream, video camera or modem.

16. The system according to claim 14, wherein at least one of the edge devices is configured to buffer a video stream in a buffer, and to control one or both of (i) a timing and (ii) an amount of data transmission from the buffered video stream over the shared communication channel.

17. The system according to claim 14, wherein at least one of the edge devices is configured to modify an encoding rate, an image resolution or a frame rate of a video stream.

18. The method according to claim 1, wherein calculating the predicted values of the transmission rates and the channel communications bandwidth comprises calculating the predicted values of one of the parameters based on past and current values of the one of the parameters.

19. The method according to claim 18, wherein calculating the predicted values of the transmission rates and the channel communications bandwidth comprises filtering a series of the data values of one of the parameters to remove random noise and calculating the predicted values based on the series from which the noise was removed.

20. The method according to claim 18, wherein calculating the predicted values of the transmission rates and the channel communications bandwidth comprises calculating the predicted values of one of the parameters based on side information different from the past and current values of the one of the parameters.

21. The method according to claim 18, further comprising collecting a plurality of sets of statistics for prediction of the one of the parameters for different environment states, and wherein calculating the predicted values comprises determining a current value of the environment state and calculating the predicted values of the one of the parameters based on a set of the statistics matching the determined current value of the environment state.

22. The method according to claim 18, wherein calculating the predicted values comprises calculating the predicted values of one of the parameters based on video analysis of images from one or more of the video cameras.

23. The method according to claim 22, wherein calculating the predicted values of one of the parameters comprises calculating based on video analysis of images from a plurality of the video cameras.

24. The method according to claim 1, wherein calculating the predicted values of one or more of the transmission rates and the channel communications bandwidth comprises calculating the predicted values based on an indication of detected motion in images from a video camera for which the prediction is performed.

25. The method according to claim 1, wherein calculating the predicted values of one or more of the transmission rates and the channel communications bandwidth comprises calculating the predicted values based on a usage state of a video camera for which the prediction is performed.

26. The method according to claim 1, wherein calculating the predicted values of one or more of the transmission rates and the channel communications bandwidth comprises calculating the predicted values using Kalman filtering or extended Kalman filtering.

27. The method according to claim 1, wherein calculating the predicted values of one or more of the transmission rates and the channel communications bandwidth comprises calculating predicted values of the transmission rates.

28. The method according to claim 1, wherein calculating the predicted values of one or more of the transmission rates and the channel communications bandwidth comprises calculating predicted values of the channel communications bandwidth.

29. The method according to claim 1, wherein calculating the predicted values of one or more of the transmission rates and the channel communications bandwidth comprises calculating the predicted values based on an indication of a current color of a traffic light in a vicinity of the camera.

30. The method according to claim 1, wherein calculating the predicted values of the transmission rates and the channel communications bandwidth comprises using different prediction methods for predicting the transmission rates and for predicting the channel communications bandwidth.

31. The method according to claim 1, wherein calculating the predicted values comprises generating for each of the parameters a model of the parameter based on the obtained data values, and calculating the predicted values at the future time, using the generated models.

32. The method according to claim 31, wherein generating for each of the parameters a model of the parameter comprises generating the model for one or more of the parameters using generalized regression models.

33. The method according to claim 31, wherein generating for each of the parameters a model of the parameter comprises generating the model for one or more of the parameters using machine learning methods.

34. The method according to claim 31, wherein generating for each of the parameters a model of the parameter comprises generating the model for one or more of the parameters using Poisson process model-based forecasting.

* * * * *